United States Patent [19]

Kuroda et al.

[11] 4,252,929

[45] Feb. 24, 1981

[54] PROCESS FOR PREPARING POLYOLEFINS

[75] Inventors: Nobuyuki Kuroda, Yokohama; Takeichi Shiraishi, Kawasaki; Akio Itoh, Yokosuka; Kazuo Matsuura, Kawasaki; Mituji Miyoshi, Kanagawa, all of Japan

[73] Assignee: Nippon Oil Company, Ltd., Tokyo, Japan

[21] Appl. No.: 97,791

[22] Filed: Nov. 27, 1979

Related U.S. Application Data

[63] Continuation of Ser. No. 724,998, Sep. 20, 1976, abandoned.

[30] Foreign Application Priority Data

Oct. 2, 1975 [JP] Japan .................. 50/118265

[51] Int. Cl.$^3$ .................. C08F 4/02; C08F 10/02
[52] U.S. Cl. .................. 526/114; 252/429 B; 526/125; 526/352; 526/906
[58] Field of Search .................. 526/125, 114

[56] References Cited

U.S. PATENT DOCUMENTS

| 3,560,146 | 2/1971 | Luciani et al. | 526/906 |
|---|---|---|---|
| 3,875,126 | 4/1975 | Tashiro et al. | 526/144 |

FOREIGN PATENT DOCUMENTS

| 2029992 | 12/1970 | Fed. Rep. of Germany . |
| 2347577 | 5/1974 | Fed. Rep. of Germany . |
| 47-19885 | 6/1972 | Japan . |
| 1292853 | 10/1972 | United Kingdom . |
| 1314053 | 4/1973 | United Kingdom . |

*Primary Examiner*—Edward J. Smith
*Attorney, Agent, or Firm*—Scully, Scott, Murphy & Presser

[57] ABSTRACT

According to the present invention, there is provided a process for preparing polyolefins comprising polymerizing or copolymerizing olefins using as catalyst a titanium-containing solid and an organometallic compound of a metal of Groups I to IV of the Periodic Table, said titanium-containing solid consisting of a reaction product obtained by copulverizing (1) a magnesium halide and/or a manganese halide, (2) an organohalide and (3) a tetravalent and/or a trivalent titanium compound(s).

7 Claims, No Drawings

PROCESS FOR PREPARING POLYOLEFINS

This is a continuation of application Ser. No. 724,998, filed Sept. 20, 1976 now abandoned.

BACKGROUND OF THE INVENTION

1. Field of the Invention

This invention relates to novel catalysts for the polymerization of olefins. More particularly, it is concerned with a process for the polymerization of olefins characterized in that a solid obtained by pulverizing a titanium compound, a component of a Ziegler catalyst, together with a magnesium halide and/or a manganese halide and an organohalide, is used as one component and, in the presence of a catalyst consisting of such solid and an organometallic compound of a metal of Groups I to IV of the Periodic Table, olefin(s) is(are) polymerized or copolymerized, whereby the yield of polymer per solid and that per transition metal are remarkably increased and a polymer having a high bulk density is obtained in high yield, resulting in the step of removing the residual catalyst becoming unnecessary.

2. Description of the Prior Art

Conventionally in the technical field of this sort there have been known, from Japanese Patent Publication No. 12105/1964, a catalyst consisting of a magnesium halide and a transition metal compound such as a titanium compound carried thereon and, from Belgian Pat. No. 742,112, a catalyst obtained by copulverizing a magnesium halide and a titanium tetrachloride.

In the preparation of polyolefins, however, it is desirable in point of productivity and slurry handling that the bulk density of the resulting polymer be as high as possible. From this point of view, with the process disclosed in the foregoing Japanese Patent Publication No. 12105/1964, the bulk density of the resulting polymer is low and the polymerization activity is not satisfactory; and, with the process of Belgian Pat. No. 742,112, the bulk density of the resulting polymer is low although the polymerization activity is high. Thus, improvements have been desired.

SUMMARY OF THE INVENTION

This invention relates to a process for preparing a novel polymerization catalyst whereby the aforementioned drawbacks are eliminated and a polymer having a high bulk density is obtained in high yield, and also to a process for polymerizing or copolymerizing olefins using the said polymerization catalyst, in which the polymerization activity is high enough to attain a low partial pressure of monomer during polymerization and the high bulk density of the resulting polymer can improve the productivity, and the extremely small amount of the residual catalyst in the resulting polymer at the end of polymerization dispenses with the step of removing catalyst in the process for preparing polyolefins, resulting in that the step of treating polymer is simplified and there is provided a process for preparing polyolefins which process as a whole is very economical.

DESCRIPTION OF THE INVENTION

Detailed features of the present invention will be apparent from the following description.

To illustrate magnesium halides used in the present invention, mention may be made of magnesium chloride, magnesium fluoride, magnesium bromide, magnesium iodide, and mixtures thereof, among which magnesium chloride is specially preferred.

As a manganese halide used in the present invention, manganese chloride is most preferred. A mixture of a magnesium halide and a manganese halide is also preferably employed in the present invention.

Organohalides used in the present invention are aliphatic, alicyclic and aromatic hydrocarbon having 1 to 20 carbon atmos which are partly substituted by halogen, including mono-, and poly-substitution products. Halogen which may be employed includes fluorine, chlorine, bromine and iodine. For example, monohalogenated hydrocarbon represented by the general formula RX wherein R is an alkyl, alkenyl, aryl or aralkyl group having 1 to 20 carbon atoms, preferably 1 to 8 carbon atoms, and X is a halogen atom, is preferably used. Di- and tri-halogenated hydrocarbons having 1 to 20 carbon atoms are preferably used, too. To illustrate such organohalides, mention may be made of methylene chloride, carbon tetrachloride, ethyl chloride, isopropyl chloride, isopropyl bromide, n-butyl chloride, n-butyl bromide, allyl chloride, n-hexyl chloride, decyl chloride, 1,1-dichloroethane, 1,2-dichloroethane, hexachloroethane, chlorobenzene, chloronaphthalene, and benzyl chloride.

Tetravalent titanium compounds used in the present invention are not specially restricted. Preferable tetravalent titanium compounds are the compounds represented by the general formula $Ti(OR)_nX_{4-n}$ wherein R is an alkyl, alkenyl, aryl or aralkyl group having 1 to 20 carbon atoms, preferably 1 to 8 carbon atoms, X is halogen atom and n is a whole number of from 0 to 4. Examples of the tetravalent titanium compounds are $TiCl_4$, $TiBr_4$, $TiI_4$, $Ti(OCH_3)Cl_3$, $Ti(OCH_3)Br_3$, $Ti(OCH_3)_2Cl_2$, $Ti(OCH_3)_2Br_2$, $Ti(OCH_3)_3Cl$, $Ti(OCH_3)_4$, $Ti(OC_2H_5)Cl_3$, $Ti(OC_2H_5)Br_3$, $Ti(OC_2H_5)_2Cl_2$, $Ti(OC_2H_5)_2Br_2$, $Ti(OC_2H_5)_3Cl$, $Ti(OC_2H_5)_4$, $Ti(O-n-C_3H_7)Cl_3$, $Ti(On-C_3H_7)_2Cl_2$, $Ti(Oi-C_3H_7)Cl_3$, $Ti(Oi-C_3H_7)Br_3$, $Ti(Oi-C_3H_7)_2Cl_2$, $Ti(Oi-C_3H_7)_2Br_2$, $Ti(Oi-C_3H_7)_3Cl$, $Ti(Oi-C_3H_7)_4$, $Ti(On-C_4H_9)Cl_3$, $Ti(On-C_4H_9)_2Cl_2$, $Ti(On-C_4H_9)_3Cl$, $Ti(On-C_4H_9)_4$, $Ti(Oi-C_4H_9)Cl_3$, $Ti(Oi-C_4H_9)_2Cl_2$, $Ti(Oi-C_4H_9)_3Cl$, $Ti(Oi-C_4H_9)_4$, $Ti(Ot-C_4H_9)Cl_3$, $Ti(Ot-C_4H_9)_2Cl_2$, $Ti(Ot-C_4H_9)_3Cl$, $Ti(Ot-C_4H_9)_4$, $Ti(On-C_5H_{11})Cl_3$, $Ti(On-C_6H_{13})Cl_3$, $Ti(OC_6H_5)Cl_3$, $Ti(OC_6H_5)_2Cl_2$, $Ti(OC_6H_5)_3Cl$, $Ti(OC_6H_5)_4$, $Ti(OCH_3)(OC_2H_5)Cl_2$, $Ti(OC_2H_5)(Oi-C_4H_9)Cl_2$, $Ti(OC_2H_5)(Oi-C_3H_7)Cl_2$, $Ti(OC_2H_5)(OC_6H_5)Cl_2$, $Ti(OCH_3)_2(OC_2H_5)_2$, $Ti(OC_2H_5)_2(Oi-C_4H_9)_2$, reaction product of $SiCl_4$ and the compound $Ti(OR)_mX_{4-m}$ and mixtures thereof.

Trivalent titanium compounds employed in the present invention are not specially restricted. Among these may be mentioned titanium trihalides obtained by reducing titanium tetrahalides with hydrogen, aluminum, titanium or an organometallic compound such as organoaluminum compound. Preferable titanium trihalides are $TiCl_3$, $TiCl_3 \cdot \frac{1}{3} AlCl_3$, and $TiBr_3$. Trivalent titanium compounds except titanium trihalides may be obtained by reducing various tetravalent titanium alkoxyhalides represented by the general formula $Ti(OR)_nX_{4-n}$ wherein R is alkyl, alkenyl, aryl or aralkyl group having 1 to 20 carbon atoms, X is halogen atom and n is a whole number of from 1 to 4, with an organometallic compound of a metal of the groups I to III of the periodic table, at a temperature of from $-80°$ C. to $200°$ C., preferably $0°$ C. to $100°$ C. and a molar ratio of titanium alkoxyhalide to organometallic compound being in the range of from 1:5 to 5:1, preferably 1:2 to 2:1.

Of course, mixtures of such compounds may be employed without any trouble. Also, in order to make the present invention further effective, titanium compounds are often used together with vanadium compounds such as vanadium tetrachloride, vanadium trichloride, vanadyl trichloride and vanadyl triethoxide. In this case, the molar ratio of vanadium to titanium in the range of from 3:1 to 0:1, preferably in the range of from 2:1 to 0.01:1.

The method of copulverization of a magnesium halide and/or a manganese halide, an organohalide and a titanium compound in the present invention is not specially restricted. That is, copulverization may be made in a simultaneous presence of all these components; or it may be such that a magnesium halide and/or a manganese halide and an organohalide are pulverized together and then a titanium compound is added, followed by application of a further pulverization; or the reaction product of an organohalide and a titanium compound may be pulverized together with a magnesium halide and/or a manganese halide.

In case a liquid titanium compound such as titanium tetrachloride is to be supported, there may be adopted a method in which the copulverized matter of a magnesium halide and/or a manganese halide and an organohalide is contacted with the liquid titanium compound and then the unreacted titanium compound is removed by washing. However, the method of supporting a required amount of a titanium compound through copulverization is simpler in the operation for catalyst preparation and is desirable. Of course, these operations should be performed in an inert gas atmosphere and moisture should be avoided as far as possible.

The blending ratio between a magnesium halide and/or a manganese halide and an organohalide is not specially restricted. However, with a too much amount of an organohalide, the polymerization activity tends to lower, while, with a too small amount, the effect of adding the organohalide cannot be expected. It is preferred that the weight ratio of a magnesium halide and/or a manganese halide to an organohalide be in the range of from 1:0.5 to 1:0.001.

The amount of a titanium compound to be supported is most preferably adjusted so that the titanium content in the resulting solid is in the range of from 0.5% to 10% by weight. In order to obtain a well-balanced activity per titanium and per solid, the range of from 1% to 8% by weight is specially preferred.

The apparatus used for the copulverization is not specially restricted, but usually employed are a ball mill, a vibration mill, a rod mill and an impact mill. Conditions such as the pulverization temperature and the pulverization time can readily be established by those skilled in the art according to the method of pulverization. In general, the pulverization temperature ranges from 0° to 200° C. and preferably from 20° to 100° C., and the pulverization time ranges from 0.5 to 50 hours and preferably from 1 to 30 hours.

The olefin polymerization reaction using the catalyst of the present invention is conducted in the same manner as in the olefin polymerization reaction using a conventional Ziegler catalyst; that is, a substantially oxygen- and moisture-free condition is maintained throughout the reaction. The conditions for the olefin polymerization involve temperatures ranging from 20° to 120° C. and preferably from 50° to 100° C., and pressures ranging from atmospheric to 70 kg/cm²·G and preferably from 2 to 60 kg/cm²·G. Adjustment of molecular weight can be made to a certain extent by changing polymerization conditions such as the polymerization temperature and the molar ratio of catalyst, but it can be made more effectively by addition of hydrogen into the polymerization system. Of course, with the catalyst of the present invention, two or more stage polymerization reactions having different polymerization conditions such as different hydrogen concentrations and polymerization temperatures can be conducted without any trouble.

The process of the present invention can be applied to the polymerization of all olefins that are polymerizable with Ziegler catalysts. For example, it is suitably used for the homopolymerization of α-olefins such as ethylene, propylene, and 1-butene, and for the copolymerization of ethylene and propylene, ethylene and 1-butene, and propylene and 1-butene.

As organometallic compounds used in the present invention, mention may be made of organic compounds of metals from Groups II–IV of the Periodic Table which are known to be a component of a Ziegler catalyst. Among them, an organoaluminum and an organozinc compounds are specially preferred. By way of illustration, the following compounds may be mentioned as typical examples: organoaluminum compounds of the general formulae $R_3Al$, $R_2AlX$, $RAlX_2$, $R_2AlOR$, $RAl(OR)X$ and $R_3Al_2X_3$ wherein R is alkyl or aryl and may be alike or different, and X is a halogen, such as triethylaluminum, triisobutylaluminum, trihexylaluminum, trioctylaluminum, diethylaluminum chloride, and ethylaluminum sesquichloride; organozinc compounds of the general formula $R_2Zn$ wherein R is alkyl and may be alike or different, such as diethylzinc; and mixtures thereof.

The amount of these organometallic compounds used in the present invention is not specially restricted, but usually it may be in the range of from 0.1 to 1,000 moles per mole of transition metal halide.

DESCRIPTION OF PREFERRED EMBODIMENTS

The following examples are further illustrative of the present invention. It is to be understood, however, that the invention is not limited thereto.

EXAMPLE 1

Catalyst Preparation

In a stainless steel pot having a content volume of 4000 ml and containing 25 stainless steel balls each ½ inch in diameter were placed 10 g of a commercially available anhydrous magnesium chloride, 2.00 g of titanium tetraisopropoxide and 1.77 g of isopropyl chloride, and a ball milling was applied for 16 hours at room temperature under a nitrogen atmosphere. The resulting solid powder contained 25.1 mg of titanium per g of the solid.

Polymerization

A 2 liter stainless steel autoclave equipped with an induction stirrer was purged with nitrogen and then charged with 1,000 ml of hexane, 2 millimole of triethylaluminum and 30 mg of the solid powder obtained above, and the temperature was raised to 90° C. with stirring. The system, which was at a pressure of 2 kg/cm²·G due to the vapor pressure of hexane, was pressurized with hydrogen to a total pressure of 6 kg/cm²·G and then with ethylene to a total pressure of 10 kg/cm$^2$.G while a polymerization was initiated. The polymerization was continued for 1 hour while ethylene was continuously introduced so that the total pressure was maintained at 10 kg/cm$^2$.G. The resulting polymer slurry was transferred into a beaker and the hexane was removed under reduced pressure to yield 86.4 g of a white polyethylene having a melt index of 14.2 and a bulk density of 0.36. Catalyst activity was 28,700 g polyethylene/g Ti.Hr.C$_2$H$_4$ pressure, 720 g polyethylene/g solid.hr.C$_2$H$_4$ pressure. Thus, there was obtained the polyethylene of a high bulk density in extremely high activity.

COMPARATIVE EXAMPLE 1

Catalyst Preparation

In a stainless steel pot having a content volume of 400 ml and containing 25 stainless steel balls each in ½ inch diameter were placed 10 g of a commercially available anhydrous magnesium chloride and 2.0 g of titanium tetraisopropoxide, and a ball milling was applied for 16 hours at room temperature under a nitrogen atmosphere. The resulting solid powder contained 27.2 mg of titanium per g of the solid.

Polymerization

A 2 liter stainless steel autoclave equipped with an induction stirrer was purged with nitrogen and then charged with 1,000 ml of hexane, 2 millimole of triethylaluminum, 30 mg of the solid powder obtained above and 5 mg of isopropoxy chloride, and the temperature was raised to 90° C. with stirring. The system, which was at a pressure of 2 kg/cm$^2$.G due to the vapor pressure of hexane, was pressurized with hydrogen to a total pressure of 6 kg/cm$^2$.G and then with ethylene to a total pressure of 10 kg/cm$^2$.G while a polymerization was initiated. The polymerization was continued for 1 hour while ethylene was continuously introduced so that the total pressure was maintained at 10 kg/cm$^2$.G. The resulting polymer slurry was transferred into a beaker and the hexane was removed under reduced pressure to yield 27.6 g of a white polyethylene having a melt index of 0.3 and a bulk density of 0.15. Catalyst activity was 8,460 g polyethylene/g Ti.hr.C$_2$H$_4$ pressure, 230 g polyethylene/g solid.hr.C$_2$H$_4$ pressure. As compared with Example 1, the activity was low and the bulk density was small.

COMPARATIVE EXAMPLE 2

In the ball mill pot described in Example 1 were placed 10 g of anhydrous magnesium chloride and 2.0 g of titanium tetraisopropoxide, and a ball milling was applied for 16 hours at room temperature under a nitrogen atmosphere. The resulting solid powder contained 27.2 mg of titanium per g of the solid.

Using 30 mg of the solid powder obtained above, a polymerization was made for 1 hour in the same procedure as in Example 1 to yield 42.0 g of a white polyethylene having a melt index of 4.2 and a bulk density of 0.21. Catalyst activity was 12,700 g polyethylene/g Ti.hr.C$_2$H$_4$ pressure, 350 g polyethylene/g solid.hr.C$_2$H$_4$ pressure.

EXAMPLE 2

In the ball mill pot described in Example 1 were placed 10 g of anhydrous magnesium chloride and 2.0 g of titanium tetraisopropoxide, and a ball milling was applied for 16 hours at room temperature under a nitrogen atmosphere. Then, 1.5 g of n-butyl chloride was added and a ball milling was further applied for 16 hours at room temperature under a nitrogen atmosphere. Then, 1.5 g of n-butyl chloride was added and a ball milling was further applied for 16 hours at room temperature under a nitrogen atmosphere. The resulting solid powder contained 26.1 mg of titanium per g of the solid.

Using 30 mg of the solid powder obtained above, a polymerization was made for 1 hour in the same procedure as in Example 1 to yield 61.2 g of a white polyethylene having a melt index of 8.4 and a bulk density of 0.30. Catalyst activity was 19,500 g polyethylene/g Ti.hr.C$_2$H$_4$ pressure, 510 g polyethylene/g solid.hr.C$_2$H$_4$ pressure.

EXAMPLE 3

In the ball mill pot described in Example 1 were placed 10 g of anhydrous magnesium chloride and 1.7 g of isopropyl bromide, and a ball milling was applied for 16 hours at room temperature under a nitrogen atmosphere. Then, 2.0 g of titanium tetraisopropoxide was added and a ball milling was further applied for 16 hours at room temperature under a nitrogen atmosphere. The resulting solid powder contained 24.3 mg of titanium per g of the solid.

Using 30 mg of the solid powder obtained above, a polymerization was made for 1 hour in the same procedure as in Example 1 to yield 70.8 g of a white polyethylene having a melt index of 7.5 and a bulk density of 0.27. Catalyst activity was 24,300 g polyethylene/g Ti.hr.C$_2$H$_4$ pressure, 590 g polyethylene/g solid.hr.C$_2$H$_4$ pressure.

EXAMPLE 4

In the ball mill pot described in Example 1 were placed 10 g of anhydrous magnesium chloride, 2.0 g of titanium tetrachloride and 1.7 g of isopropyl chloride, and a ball milling was applied for 16 hours at room temperature under a nitrogen atmosphere. The resulting solid powder contained 37.5 mg of titanium per g of the solid.

Using 30 mg of the solid powder obtained above, a polymerization was made for 1 hour in the same procedure as in Example 1 to yield 264.0 g of a white polyethylene having a melt index of 17.7 and a bulk density of 0.26. Catalyst activity was 58,700 g polyethylene/g Ti.hr.C$_2$H$_4$ pressure, 2,200 g polyethylene/g solid.hr.C$_2$H$_4$ pressure.

COMPARATIVE EXAMPLE 3

In the ball mill pot described in Example 1 were placed 10 g of anhydrous magnesium chloride and 2.0 g of titanium tetrachloride, and a ball milling was applied for 16 hours at room temperature under a nitrogen atmosphere. The resulting solid powder contained 42.1 mg of titanium per g of the solid.

Using 30 mg of the solid powder obtained above, a polymerization was made for 1 hour in the same procedure as in Example 1 to yield 162.1 g of a white polyethylene having a melt index of 7.2 and a bulk density of 0.14. Catalyst activity was 32,100 g polyethylene/g Ti.hr.C$_2$H$_4$ pressure, 1,350 g polyethylene/g solid.hr.C$_2$H$_4$ pressure.

EXAMPLE 5

In the ball mill pot described in Example 1 were placed 10 g of anhydrous magnesium chloride, 2.0 g of titanium tetra-n-butoxide and 11.3 g of isopropyl chloride, and a ball milling was applied for 16 hours at room temperature under a nitrogen atmosphere. The resulting solid powder contained 22.6 mg of titanium per g of the solid.

Using 30 mg of the solid powder obtained above, a polymerization was made for 1 hour in the same procedure as in Example 1 to give 103.5 g of a white polyethylene having a melt index of 8.0 and a bulk density of 0.27. Catalyst activity was 338,100 g polyethylene/g Ti·hr·C$_2$H$_4$ pressure, 8660 g polyethylene/g solid·hr·C$_2$H$_4$ pressure.

COMPARATIVE EXAMPLE 4

In the ball mill pot described in Example 1 were placed 10 g of anhydrous magnesium chloride and 2.0 g of titanium tetra-n-butoxide, and a ball milling was applied for 16 hours at room temperature under a nitrogen atmosphere. The resulting solid powder contained 22.3 mg of titanium per g of the solid.

Using 30 mg of the solid powder obtained above, a polymerization was conducted for 1 hour in the same procedure as in Example 1 to give 338.4 g of a white polyethylene having a melt index of 6.3 and a bulk density of 0.118. Catalyst activity was 113,700 g polyethylene/g Ti·hr·C$_2$H$_4$ pressure, 3320 g polyethylene/g solid·hr·C$_2$H$_4$ pressure.

EXAMPLE 6

In the ball mill pot described in Example 1 were placed 10 g of anhydrous magnesium chloride, 2.0 g of titanium tetraisopropoxide and 1.55 g of n-hexyl chloride, and a ball milling was applied for 16 hours at room temperature under a nitrogen atmosphere. The resulting solid powder contained 24.2 mg of titanium per g of the solid.

Using 30 mg of the solid powder obtained above, a polymerization was conducted in the same procedure as in Example 1 to give 997.2 g of a white polyethylene having a melt index of 7.88 and a bulk density of 0.229. Catalyst activity was 333,500 g polyethylene/g Ti·hr·C$_2$H$_4$ pressure, 8100 g polyethylene/g solid·hr·C$_2$H$_4$ pressure.

EXAMPLE 7

In the ball mill pot described in Example 1 were placed 10 g of anhydrous magnesium chloride, 2.0 g of titanium tetraisopropoxide and 1.77 g of benzyl chloride, and a ball milling was applied for 16 hours at room temperature under a nitrogen atmosphere. The resulting solid powder contained 26.1 mg of titanium per g of the solid.

Using 30 mg of the solid powder obtained above, a polymerization was conducted in the same procedure as in Example 1 to give 1177.6 g of a white polyethylene having a melt index of 10.5 and a bulk density of 0.331. Catalyst activity was 377,500 g polyethylene/g Ti·hr·C$_2$H$_4$ pressure, 9980 g polyethylene/g solid·hr·C$_2$H$_4$ pressure.

EXAMPLE 8

In the ball mill pot described in Example 1 were placed 10 g of anhydrous magnesium chloride, 2.0 g of a titanium trichloride eutectic mixture (TiCl$_3$·$\frac{1}{3}$AlCl$_3$) and 1.77 g of isopropyl chloride, and a ball milling was applied for 16 hours at room temperature under a nitrogen atmosphere. The resulting solid powder contained 24.8 mg of titanium per g of the solid.

Using 30 mg of the solid powder obtained above, a polymerization was conducted for 1 hour in the same procedure as in Example 1 to give 1398.0 g of a white polyethylene having a melt index of 9.8 and a bulk density of 0.225. Catalyst activity was 446,400 g polyethylene/g Ti·hr·C$_2$H$_4$ pressure, 11,150 g polyethylene/g solid·hr·C$_2$H$_4$ pressure.

COMPARATIVE EXAMPLE 5

In the ball mill pot described in Example 1 were placed 10 g of anhydrous magnesium chloride and 2.0 g of a titanium trichloride eutectic mixture (TiCl$_3$·$\frac{1}{3}$AlCl$_3$), and a ball milling was applied for 16 hours at room temperature under a nitrogen atmosphere. The resulting solid powder contained 26.9 mg of titanium per g of the solid.

Using 30 mg of the solid powder obtained above, a polymerization was conducted for 1 hour in the same procedure as in Example 1 to give 1068.8 g of a white polyethylene having a melt index of 6.2 and a bulk density of 0.144. Catalyst activity was 333,100 g polyethylene/g Ti·hr·C$_2$H$_4$ pressure, 8990 g polyethylene/g solid·hr·C$_2$H$_4$ pressure.

EXAMPLE 9

A 2 liter stainless steel autoclave equipped with an induction stirrer was purged with nitrogen and then charged with 1,000 ml of hexane, 2 millimole of triethylaluminum and 30 mg of the solid powder obtained in Example 1, and the temperature was raised to 90° C. with stirring. The system, which was at a pressure of 2 kg/cm$^2$·G due to the vapor pressure of hexane, was pressurized with hydrogen to a total pressure of 6 kg/cm$^2$·G and then with an ethylene-propylene mixture containing 2 mole % of propylene to a total pressure of 10 kg/cm$^2$·G while a polymerization was conducted for 1 hour. The resulting polymer slurry was transferred into a beaker and the hexane was removed under reduced pressure to give 997.2 g of a white polymer having a melt index of 12.9 and a bulk density of 0.333. Catalyst activity was 332,300 g polymer/g Ti·hr·C$_2$H$_4$ pressure, 8110 g polymer/g solid·hr·C$_2$H$_4$ pressure.

We claim:

1. A process for preparing polyolefins comprising polymerizing ethylene or copolymerizing ethylene with minor amounts of alpha olefins using a catalyst consisting essentially of a titanium-containing solid and an organometallic compound selected from the group consisting of organoaluminum compounds of the general formula R$_3$Al, R$_2$AlX, RAlX$_2$, R$_2$AlOR, RAl(OR)X and R$_3$Al$_2$X$_3$ wherein R is alkyl or aryl and may be alike or different and X is halogen, and organozinc compounds of the general formula R$_2$Zn wherein R is alkyl and may be alike or different, said titanium-containing solid consisting essentially of a reaction product obtained by copulverizing (1) a magnesium halide selected from the group consisting of magnesium fluoride, magnesium chloride, magnesium bromide and magnesium iodide and/or a manganese halide selected from the group consisting of manganese fluoride, manganese chloride, manganese bromide and manganese iodide, (2) an organohalide selected from the group consisting of aliphatic and alicyclic hydrocarbons having 1 to 20 carbon atoms and containing at least one halogen substituent, and aromatic hydrocarbons having 6 to 20 carbon atoms and containing at least one halogen substituent, and (3) a titanium compound selected from the group consisting of (i) tetravalent titanium compound represented by the general formula $Ti(OR)_nX_{a-n}$ wherein R is an alkyl, alkenyl, aryl or aralkyl group having 1 to 20 carbon atoms, X is a halogen atom and n is a whole number of from 0 to 4, and (ii) trivalent titanium compound selected from the group consisting of titanium trihalides obtained by reducing titanium tetrahalide with hydrogen, aluminum, titanium or an organometallic compound, and trivalent titanium compounds obtained by reducing tetravalent titanium alkoxyhalides represented by the general formula $Ti(OR)_nX_{4-n}$ wherein R is an alkyl, alkenyl, aryl or aralkyl having 1 to 20 carbon atoms, X is a halogen atom and n is a whole numberof from 1 to 4, with an organometallic compound of a metal of the groups I to III of the Periodic Table, wherein the weight ratio of the magnesium halide and/or manganese halide to the organohalide is in the range of from 1:0.5 to 1:0.01.

2. A process according to claim 1 wherein the organohalide is a mono-, di- or tri-halogen-substituted aliphatic hydrocarbon or a mono-, di, or tri-halogen-substituted alicyclic hydrocarbon.

3. A process according to claim 1 wherein the organohalide is a member selected from the group consisting of methylene chloride, ethyl chloride, isopropyl chloride, isopropyl bromide, n-butyl chloride, n-butyl bromide, allyl chloride, n-hexyl chloride, decyl chloride, 1,1-dichloroethane, 1,2-dichloroethane, and benzyl chloride.

4. A process according to claim 1 wherein the titanium-containing solid contains titanium in an amount ranging from 0.5 to 10 weight percent.

5. A process according to claim 1 wherein the copulverization is conducted for 0.5 to 50 hours at a temperature in the range of from 0° to 200° C. and under an inert gas atmosphere.

6. A process according to claim 1 wherein the polymerization or copolymerization is conducted at a temperature in the range of from 20° to 120° C. and at a pressure in the range of from atmospheric pressure to 70 kg/cm$^2$.G.

7. A process according to claim 1 wherein the polymerization or copolymerization is conducted with hydrogen added into the polymerization system.

* * * * *